United States Patent Office 3,361,657
Patented Jan. 2, 1968

3,361,657
SELECTIVE CONVERSION OF 1,1,1-TRICHLORO-ACETONE TO 1,1,1,3-TETRACHLOROACETONE BY THE USE OF ACTINIC LIGHT
Michael Kokorudz, Southgate, Mich., assignor to Wyandotte Chemicals Corporation, Wyandotte, Mich., a corporation of Michigan
No Drawing. Filed Aug. 21, 1963, Ser. No. 303,656
3 Claims. (Cl. 204—158)

The present invention relates to the selective chlorination of 1,1,1-trichloroacetone, and is more particularly concerned with a process for the selective conversion of 1,1,1-trichloroacetone to 1,1,1,3 - tetrachloroacetone in the presence of actinic light.

1,1,1,3-tetrachloroacetone is a valuable chemical intermediate used for the preparation of such products as flame resistant polyurethanes, agricultural chemicals, and pharmaceutical chemicals. The production of 1,1,1,3-tetrachloroacetone has usually been accomplished by chlorinating acetone or chlorinated acetones such as 1,1,3 - trichloroacetone, 1,3-dichloroacetone, and monochloroacetone. These procedures have the disadvantage of producing large quantities of undesired by-products. On the other hand the chlorination of 1,1,1-trichloroacetone has long been considered a difficult task. To quote Arndt et al., Monatsh., 59, 202–219 (1932): "1,1,1-trichloroacetone is surprisingly resistant against further chlorination; 1,1,1,3-tetrachloroacetone forms at a long heating with a mole of sulfurylchloride at 180 degrees centigrade."

It would be highly desirable to have available a method for the production of 1,1,1,3 - tetrachloroacetone by a more convenient and facile process than heretofore available.

It is therefore an object of the present invention to provide a method of producing 1,1,1,3-tetrachloroacetone in high yields and conversions, and with unprecedented freedom from undesired by-products. Another object is to provide a method for converting 1,1,1-trichloroacetone to 1,1,1,3-tetrachloroacetone in high yields and conversions and under less strenuous reaction conditions than have previously been employed. It is still another object of the invention to provide a method of producing 1,1,1,3-tetrachloroacetone from 1,1,1-trichloroacetone in high yields and without substantial production of pentachloroacetone. Additional objects will be apparent to one skilled in the art and still other objects will become apparent hereinafter.

It has now been found that 1,1,1,3-tetrachloroacetone may be prepared by the chlorination of 1,1,1-trichloroacetone in a recycling process in which the starting trichloroacetone is placed in a distillation vessel. From there it is distilled off and introduced into a limited reaction zone and partially reacted with chlorine. The temperature of the distillation vessel is at least as high as the boiling point of the trichloroacetone and below the boiling point of the tetrachloroacetone product. The mixture containing the tetrachloroacetone and the unreacted trichloroacetone is then returned in liquid form to the distillation vessel, where the unreacted trichloroacetone is once more vaporized and recycled. By controlling the reaction temperature, the period during which the trichloroacetone remains in the reaction zone, and the mole ratio of chlorine to trichloroacetone within the reaction zone, the reaction may be continued until substantially one mole of chlorine has reacted with each mole of trichloroacetone originally in the distillation vessel, while minimizing the formation of by-products such as pentachloroacetone.

According to the invention, the 1,1,1-trichloroacetone is treated with free chlorine in the presence of actinic light having wave lengths in the range of about 1850 to about 7,000 Angstroms. The actinic light may be readily produced by commercial ultraviolet lamps.

The complete process comprises vaporizing the trichloroacetone from a vessel such as a distillation flask maintained at a temperature in the range of from the boiling point of the trichloroacetone (134° C.) to just below the boiling point of the tetrachloroacetone (180° C.). Under these conditions, the trichloroacetone distills out of the vessel, leaving behind any tetrachloroacetone which may be present. The trichloroacetone is then partially chlorinated in a reactor and returned to the starting distillation flask where it resumes the recycling process.

The process of the present invention may be carried out either as a vapor phase reaction or as a liquid phase reaction. In the vapor phase reaction the trichloroacetone vapor leaving the starting vessel is directly introduced into the reaction zone where it is maintained in contact with liquid chloroacetones and chlorinated reaction products, and in the presence of actinic light. Chlorine is introduced into the reaction zone at such a rate that the instantaneous chlorine concentration is in the range of about 0.05 to about 0.2 mole per mole of trichloroacetone. During each pass through the reaction zone only a part of the trichloroacetone is reacted to tetrachloroacetone. The reactants and reaction product are removed from the reaction zone before the reaction is complete in order to avoid the formation of pentachloroacetones. However, the recycling reaction continues until the total amount of chlorine added during the course of the reaction approaches the theoretical amount of one mole of chlorine per mole of trichloroacetone. The advantage of the present method is that almost total conversion of the trichloroacetone is accomplished over the course of the reaction without the formation of substantial amounts of pentachloroacetone. Unreacted trichloroacetone is condensed and returned to the distillation flask.

The liquid phase reaction which may be used alternatively is similar to the vapor phase method described above except that the trichloroacetone vapor which distills from the distillation vessel is first condensed to a liquid before it is introduced into the reaction zone. However, the instantaneous chlorine concentration is maintained within the same limits for the liquid phase process as that described above for the vapor process.

The resulting tetrachloroacetone containing small amounts of trichloroacetone and pentachloroacetone is purified according to conventional procedures. For example, the mixture may be first treated to remove hydrogen chloride by passing air through the mixture of products, and the desired 1,1,1,3-tetrachloroacetone then isolated according to standard procedures for separating halogenated ketones as, for example, by fractional distillation under reduced pressure.

The process of the present invention for chlorinating 1,1,1-trichloroacetone to 1,1,1,3-tetrachloroacetone may be carried out in an apparatus which comprises three zones.

(1) A heating zone into which the starting 1,1,1-trichloroacetone may be introduced and from which it may be vaporized;

(2) A reaction zone into which both the starting 1,1,1-trichloroacetone and the chlorine may be introduced and which is illuminated by actinic light; and (3) A condensing zone for condensing the unreacted starting material and desired product, but which will allow uncondensed gaseous by-products to pass through and out of the apparatus, connected in such a manner as to allow vapor to pass from the heating zone to the reaction zone to the condensing zone, and liquids to pass from the condensing zone back to the reaction zone and thence to the heating zone. The condensing zone is used subsequent to the reaction zone only in the case of the vapor phase reaction.

The heating zone of the apparatus normally comprises a closed container into which the starting 1,1,1-trichloroactone or mixtures thereof may be introduced either by opening the container or by continuous feed as by means of a dropping funnel, and which is equipped with a source of heat which may be controlled. The heating zone is connected to the reaction zone either directly or through some means for fractionating vapors. The reaction zone comprises a closed transparent container, fitted with a means for introducing free gaseous chlorine, the reaction zone being illuminated by a source of actinic light during the reaction period. The temperature in the reaction zone is maintained in the range of about 130° to about 135° C. in the vapor phase chlorination, and at a temperature which may be as low as 100° C. in the liquid phase chlorination. The reaction zone is connected to a condensing zone in the vapor phase process, preferably directly, for condensation and return of reaction product and unreacted starting material. The condensing zone is normally a container which can be maintained at such a temperature that the 1,1,1-trichloroacetone and 1,1,1,3-tetrachloroacetone condense while lower-boiling gaseous by-products such as hydrogen chloride do not. Preferably this container is not closed, but has an opening provided through which the gaseous by-product may escape. A single container may contain two or even all three of the zones described. As already pointed out the three zones are connected in such a manner that liquids flow from the condensing zone to the reaction zone to the heating zone while vapors flow from the heating zone to the reaction zone to the condensing zone. This may be conveniently accomplished by a gravity feed when the heating zone is surmounted by the reaction zone, which is in turn surmounted by the condensing zone. For example, the apparatus may consist of two glass reaction flasks connected vertically by a fractionation column, the lower flask being equipped with a controllable heating mantle, and the upper flask being equipped with a capillary tube for introducing chlorine and an ultraviolet lamp arranged in juxtaposition to the upper flask so as to illuminate the reaction zone. The upper flask may be connected directly to a reflux condenser.

The chlorination is conducted by introducing the starting material into the heating zone, e.g., into the lower flask, which is brought to a temperature between the boiling points of the 1,1,1-trichloroacetone and the 1,1,1,3-tetrachloroacetone, that is, about 134° to 182° C. (vapor phase) or 100° to 182° C. (liquid phase).

The temperature at which the distillation vessel is maintained depends to some extent on the composition of the liquid. As the proportion of 1,1,1,3-tetrachloroacetone (and pentachloroacetone) increases, the temperature gradually increase. The final temperature should not exceed 175° C. Temperatures higher than this would permit distillation of the higher boiling products and recycling to the reaction zone, which is not desirable, and would also lead to more or less decomposition and discoloring of the reaction mass.

The following examples are given by way of illustration only and are not to be construed as limiting.

*Example 1.—Vapor phase reaction*

The reacton apparatus consisted of a two-necked round-bottom flask equipped with a controllable heating mantle, fitted with a thermometer and a fractionating column which was connected to a reactor filled with crushed quartz glass supported by larger pieces of quartz glass placed on the bottom of the reactor, for introducing chlorine, illuminated by a 275 watt sun lamp, and surmounted by a reflux condenser. To the reaction flask was charged 2423 grams (15 moles) of 1,1,1-trichloroacetone, and the starting material then heated. The 1,1,1-trichloroacetone was maintained above its boiling point while 2185 grams (30.5 moles) of chlorine were added to the reactor over a period of 39 hours.

Hydrochloric acid was removed from the product by passing air through the mixture, and the residue then distilled under reduced pressure. The product consisted of 534 grams (3.3 moles) of unreacted 1,1,1-trichloroacetone (22% of theory), 68 grams (0.3 mole) of a mixture of 1,1,1-trichloro- and 1,1,1,3-tetrachloroacetone boiling at 75° to 116° C. at 100 mm. mercury, 2057 grams (10.5 moles) of 1,1,1,3-tetrachloroacetone (70% of theory), 24 grams of unidentified solid, and 77 grams of tarry residue. The 1,1,1,3-tetrachloroacetone contained approximately 2% to 5% pentachloroacetone according to gas-liquid chromatogram. Over-all conversion of 1,1,1,3-tetrachloroacetone was 72% and yield was 94.0%.

*Example 2.—Vapor phase reaction*

In the apparatus described in Example 1, 2433 grams (15 moles) of 1,1,1-trichloroacetone were reacted with 2727 grams (38.4 moles) of chlorine at a heating temperature of 134° to 180° C. over a period of 52.5 hours.

Hydrochloric acid was removed from the product by passing air through the mixture and the residue then distilled under reduced pressure. The product consisted of 287 grams (1.8 moles) of unreacted 1,1,1-trichloroacetone (12% of theory), 2064 grams (10.4 moles) of 1,1,1,3-tetrachloroacetone (69% of theory) boiling at 114° to 119° C. at 100 mm. mercury pressure, 45 grams of a mixture of 1,1,1-trichloroacetone and 1,1,1,3-tetrachloroacetone, boiling at 80° to 90° C. at 20 mm. mercury pressure, 9 grams of unidentified high boiling liquid, and 96 grams of residue. The 1,1,1,3-tetrachloroacetone contained about three to five percent pentachloroacetone. The over-all conversion to 1,1,1,3-tetrachloroacetone was 71% and the yield was 83%.

*Example 3.—Vapor phase reaction*

In the apparatus described in Example 1, 2423 grams (15 moles) of 1,1,1-trichloroacetone were reacted with 2720 grams (38.3 moles) of chlorine with a heating temperature of 134° to 175° C. over a period of 29 hours.

Hydrochloric acid was removed from the product by passing air through the mixture, and the residue then distilled under reduced pressure. The product consisted of 490 grams (3 moles) of unreacted 1,1,1-trichloroacetone (20% of theory), 116 grams of a mixture of 1,1,1-trichloroacetone and 1,1,1,3-tetrachloroacetone (65% of theory), and 196 grams of residue. The tetrachloroacetone contained only about 5% of pentachloroacetone. Over-all conversion to 1,1,1,3-tetrachloroacetone was 75% and yield was 86.6%.

*Example 4.—Liquid phase reaction*

A reaction apparatus was assembled comprising a two-necked round-bottom flask equipped with a controllable heating mantle and fitted with a thermometer and a fractionating column. The flask was connected to a reactor equipped with a tube for introducing chlorine, illuminated by a 275 watt sun lamp, and surmounted by a reflux condenser. The reactor was so constructed that vapors from the flask passed directly to the surmounted reflux condenser. The flask was filled with starting material consisting of 1938 grams (12 moles) of 1,1,1-trichloroacetone. The flask was heated and maintained under reflux conditions while 537 grams (7.56 moles) of chlorine were added to the 1,1,1-trichloroacetone in the reactor over a period of 21.25 hours. The 1,1,1,3-tetrachloroacetone formed by the reaction with the chlorine was continuously returned to the flask.

Hydrochloric acid was removed from the product by passing air through the mixture and the residue then distilled under reduced pressure. The product consisted of 744 grams (4.6 moles) of unreacted 1,1,1-trichloroacetone (38.3% of theory), 1220 grams (6.2 moles) of 1,1,1,3-tetrachloroacetone (51.7% of theory), 36 grams of a mixture of 1,1,1-trichloroacetone and 1,1,1,3-tetrachloroacetone, and 62 grams of residue. The tetrachloroacetone contained about 5% of pentachloroacetone.

*Example 5.—Liquid phase reaction*

In the apparatus described in Example 4, 1863 grams (11.5 moles) of 1,1,1-trichloroacetone were reacted with 525 grams (7.4 moles) of chlorine over a period of 26.25 hours. The reflux average was 279.7 grams (1.73 moles) per ten minutes, and the chlorine feed was 0.3102 mole per hour.

Hydrochloric acid was removed from the product by passing air through the mixture and the residue then distilled under reduced pressure. The product consisted of 607 grams (3.7 moles) of unreacted 1,1,1-trichloroacetone (32% of theory), 1296 grams (6.7 moles) of 1,1,1,3-tetrachloroacetone (58% of theory), 21 grams of a mixture of 1,1,1-trichloroacetone and 1,1,1,3-tetrachloroacetone, and 133 grams of residue. The tetrachloroacetone contained about 5% pentachloroacetone. The yield of 1,1,1,3-tetrachloroacetone was 87%.

Various modifications and equivalents will be apparent to one skilled in the art and may be made in the method of the present invention without departing from the spirit or scope thereof, and it is therefore to be understood that the invention is to be limited only by the scope of the appended claims.

I claim:
1. A recycling process for the high yield production of 1,1,1,3-tetrachloroacetone from 1,1,1-trichloroacetone, each cycle comprising distilling 1,1,1-trichloroacetone from a distillation vessel maintained at a temperature in the range of at least the boiling point of 1,1,1-trichloroacetone to below the boiling point of said 1,1,1,3-tetrachloroacetone, reacting the distilled 1,1,1-trichloroacetone with chlorine in a reactor in the presence of actinic light at a temperature of about 100–135° C., removing the reaction mixture comprised of 1,1,1,3-tetrachloroacetone and unreacted 1,1,1-trichloroacetone from said reactor before a substantial amount of pentachloroacetone has formed, and returning the reaction mixture to said distillation vessel, the molar ratio of chlorine to 1,1,1-trichloroacetone in said reactor being maintained in the range of about 0.05:1 to 0.2:1 and recycling being continued until about one mole of chlorine has reacted for each mole of 1,1,1-trichloroacetone.

2. A process according to claim 1 wherein the 1,1,1-trichloroacetone distilled from said distillation vessel is reacted in said reactor while in the vapor phase with said chlorine at a temperature of about 130–135° C.

3. A process according to claim 1 wherein the 1,1,1-trichloroacetone vapor from said distillation vessel is first condensed to a liquid before reacting with said chlorine and is reacted with said chlorine at a temperature of about 100–130° C.

References Cited
UNITED STATES PATENTS
2,199,934   5/1940   Heisel et al. _____ 204—158

HOWARD S. WILLIAMS, *Primary Examiner.*